(12) United States Patent
Glass et al.

(10) Patent No.: US 8,335,706 B1
(45) Date of Patent: Dec. 18, 2012

(54) PROGRAM MANAGEMENT FOR INDETERMINATE SCOPE INITIATIVES

(75) Inventors: Marie Lynam Glass, Oak Hill, VA (US); Barry Alexander McIntyre, Sr., Independence, MO (US); Robert Frederick Boelter, Flowery Branch, GA (US)

(73) Assignee: Sprint Communications Company L.P., Overland Park, KS (US)

( * ) Notice: Subject to any disclaimer, the term of this patent is extended or adjusted under 35 U.S.C. 154(b) by 819 days.

(21) Appl. No.: 12/397,970

(22) Filed: Mar. 4, 2009

(51) Int. Cl.
G06Q 10/00 (2012.01)

(52) U.S. Cl. ............. 705/7.16; 705/7.11; 705/7.23; 718/100; 718/106

(58) Field of Classification Search .............. None
See application file for complete search history.

(56) References Cited

U.S. PATENT DOCUMENTS

| | | | |
|---|---|---|---|
| 6,324,647 B1* | 11/2001 | Bowman-Amuah | 726/23 |
| 7,613,623 B2* | 11/2009 | Nemecek et al. | 705/7.16 |
| 7,937,281 B2* | 5/2011 | Miller et al. | 705/7.11 |
| 2002/0198926 A1* | 12/2002 | Panter et al. | 709/106 |
| 2004/0054565 A1* | 3/2004 | Nemecek et al. | 705/7 |
| 2004/0107125 A1* | 6/2004 | Guheen et al. | 705/7 |
| 2005/0114829 A1* | 5/2005 | Robin et al. | 717/101 |
| 2006/0235732 A1* | 10/2006 | Miller et al. | 705/7 |
| 2008/0052358 A1* | 2/2008 | Beaven et al. | 709/205 |
| 2009/0113427 A1* | 4/2009 | Brady et al. | 718/100 |

OTHER PUBLICATIONS

Anderson, L.. Systems engineering: An investigation of managing development project requirements. Ph.D. dissertation, Capella University, United States—Minnesota.*

Migliaccio, G.. Planning for strategic change in the project delivery strategy. Ph.D. dissertation, The University of Texas at Austin, United States—Texas.*

Nehme, J.. Systems Consulting and Engineering Game of Innovation: Changes to the project definition and scope. Ph.D. dissertation, Ecole Polytechnique, Montreal (Canada), Canada.*

Mulva, Stephen Patrick (2004). ARIES: A theoretical framework for evaluating aspects of enterprise sustainability. Ph.D. dissertation, Georgia Institute of Technology, United States—Georgia.*

* cited by examiner

*Primary Examiner* — Gurkanwaljit Singh

(57) ABSTRACT

A system provides program management for indeterminate scope initiatives. The system includes a user interface, a processor, and a management component. The management component, when executed by the processor, receives initiative data defined by preliminary initiative development, assigns the initiative to a program management team if the initiative is indeterminate in scope, and enables the program management team to develop the initiative to determine whether the initiative is to be developed as multiple projects. The management component assigns the initiative to a project management team if the initiative is not to be developed as multiple projects, and enables the program management team to develop the initiative as multiple projects if the initiative is to be developed as multiple projects. The program management team has a capacity to manage a group of related projects in a coordinated manner to obtain benefits and control unavailable from managing the group of related projects individually.

8 Claims, 5 Drawing Sheets

PROGRAM MANAGEMENT FOR INDETERMINATE SCOPE INITIATIVES

CROSS-REFERENCE TO RELATED APPLICATIONS

None.

STATEMENT REGARDING FEDERALLY SPONSORED RESEARCH OR DEVELOPMENT

Not applicable.

REFERENCE TO A MICROFICHE APPENDIX

Not applicable.

BACKGROUND

A project may be a temporary endeavor undertaken to create a unique product or service. An idea or concept may be reviewed and developed into an initiative that may be developed into a project or a group of related projects. An initiative that is small in scope requires a limited level of effort over a limited amount of time, such as six people working for six months, and may be assigned to a project management team to develop the initiative as a single project. An initiative that is large in scope requires a significant level of effort over a significant amount of time, such as eighteen people working for eighteen months, and may be assigned to a program management team to develop the initiative as a group of related projects. A program management team has a capacity to manage a group of related projects in a coordinated manner to obtain benefits and control that may be unavailable when managing the group of related projects individually. A program management team (by contrast with a project management team) may manage a single initiative that is developed as multiple projects or manage independent projects that compete for the same resources, technology, or binding characteristics requiring close coordination. Program management focuses primarily on providing the framework for optimizing business value delivery and reducing risk to business investments while maintaining an understanding of budget, scope and cost. In contrast, project management focuses primarily on meeting scope, cost, and schedule objectives.

SUMMARY

In some embodiments, a system is provided for program management for indeterminate scope initiatives. The system includes a user interface, a processor, and a management component. The management component, when executed by the processor, receives initiative data defined by initial development of an initiative to determine whether the initiative is indeterminate in scope, and assigns the initiative to a program management team in response to a determination that the initiative is indeterminate in scope. The management component also enables the program management team to develop the initiative to determine whether the initiative is to be developed as multiple projects, and receives a determination whether the initiative is to be developed as multiple projects. Additionally, the management component assigns the initiative to a project management team in response to receiving a determination that the initiative is not to be developed as multiple projects, and enables the program management team to develop the initiative as multiple projects in response to receiving a determination that the initiative is to be developed as multiple projects. The program management team has a capacity to manage a group of related projects in a coordinated manner to obtain benefits and control unavailable from managing the group of related projects individually.

In some embodiments, a method is provided for program management for indeterminate scope initiatives. Initiative data is received. Whether an initiative is indeterminate in scope is determined based on the initiative data defined by initial development of the initiative. The initiative is assigned to a program management team in response to a determination that the initiative is indeterminate in scope, wherein the program management team has a capacity to manage a group of related projects in a coordinated manner to obtain benefits and control unavailable from managing the group of related projects individually. The program management team is enabled to develop the initiative to determine whether the initiative is to be developed as multiple projects. A determination whether the initiative is to be developed as multiple projects is received via a user interface. The initiative is assigned to a project management team in response to receiving a determination that the initiative is not to be developed as multiple projects. The program management team is enabled to develop the initiative as multiple projects in response to receiving a determination that the initiative is to be developed as multiple projects.

In some embodiments, a method is provided for program management for indeterminate scope initiatives. Initiative data is received. Whether an initiative is indeterminate in scope is determined based on the initiative data defined by initial development of the initiative, wherein the initiative is indeterminate in scope if the initiative lacks at least one of an estimate for a duration and an estimate for a level of effort. The initiative is assigned to a program management team in response to a determination that the initiative is indeterminate in scope, wherein the program management team has a capacity to manage a group of related projects in a coordinated manner to obtain benefits and control unavailable from managing the group of related projects individually. The program management team is enabled to develop the initiative to determine whether the initiative is to be developed as multiple projects. A determination whether the initiative is to be developed as multiple projects is received via a user interface. The initiative is assigned to a project management team in response to receiving a determination that the initiative is not to be developed as multiple projects. The program management team is enabled to develop the initiative as multiple projects in response to receiving a determination that the initiative is to be developed as multiple projects. Whether development of a project of the multiple projects or the initiative has reached a development milestone is determined. Whether to continue development of the project or the initiative is determined in response to a determination that development of the project or the initiative has reached a development milestone. Development of the project or the initiative is continued in response to a determination to continue development of the project or the initiative.

These and other features will be more clearly understood from the following detailed description taken in conjunction with the accompanying drawings and claims.

BRIEF DESCRIPTION OF THE DRAWINGS

For a more complete understanding of the present disclosure, reference is now made to the following brief description, taken in connection with the accompanying drawings and detailed description, wherein like reference numerals represent like parts.

DETAILED DESCRIPTION

Figure 1:
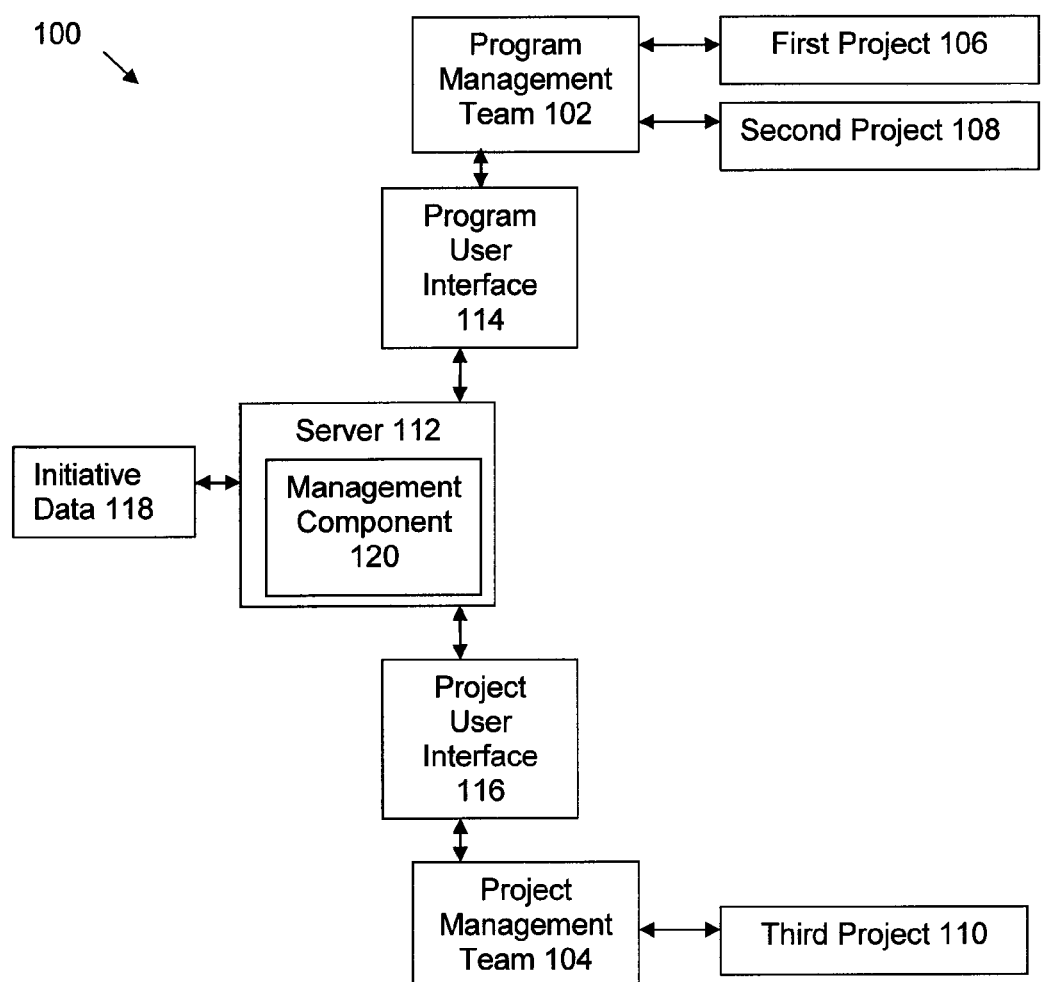
FIG. 1 illustrates a system for program management for indeterminate scope initiatives according to some embodiments of the present disclosure.

It should be understood at the outset that although illustrative implementations of one or more embodiments are illustrated below, the disclosed systems and methods may be implemented using any number of techniques, whether currently known or in existence. The disclosure should in no way be limited to the illustrative implementations, drawings, and techniques illustrated below, but may be modified within the scope of the appended claims along with their full scope of equivalents.

When an idea or concept is initially developed as an initiative, initiative data may be defined for the initiative. Examples of initiative data include an estimated duration for completion and an estimated level of effort, which may specify estimated hours of work and estimated expenses. The initial developers of an initiative, such as a portfolio management team, may not be able to define some of the initiative data for an initiative due to a number of reasons. For example, if an initiative is not fully defined, somewhat unspecified, partially undefined, associated with a relatively new area of work, related to an area of work where additional learning is expected, or fairly complex, then the initiative data may lack some estimates.

An initiative is indeterminate in scope if the initiative lacks a specific estimate for a duration and/or a specific estimate for a level of effort. For example, an initiative to improve a software application that executes on a mobile phone may be an initiative that is small in scope if only the application needs modification. This initiative may be large in scope if many other applications that interact with the identified application also require modification. If the scope of required application modifications for the initiative is not known initially, estimates of the duration and level of effort required for the initiative may be so speculative and wide-ranging that no estimates are submitted during the initial development of the initiative, thereby making the initiative indeterminate in scope. An indeterminate initiative has traditionally been assigned to a project management team to avoid assigning the indeterminate initiative to a program management team, which is typically larger than a project management team, which typically incurs greater expenses than a project management team, and which typically requires more time to develop an initiative than a project management team requires.

However, assigning an indeterminate initiative to a project development team may lead to development challenges. If the project development team determines that the indeterminate initiative is best implemented as multiple projects, the project development team may not have the authority to approve each of the projects or to assign any of the projects to other project management teams. If the project development team attempts to develop the initiative as multiple projects, the resources budgeted for what was presumed to be a single project may be insufficient for the development of the multiple projects. The project development team may not have the authority to increase its limited budget of resources for the projects, which may result in development delays while waiting for the requested increase of budgeted resources to be approved. Additionally, if the project development team is allocated the full budget of resources for the initiative, the project development team may continue developing the fully funded initiative even after further development of the multiple projects for the initiative is no longer objectively justifiable.

Embodiments of the present disclosure provide systems and methods for program management for indeterminate initiatives. After an initiative is initially developed and initiative data is defined for the initiative, a management component receives the initiative data from a human or from a software program to determine whether an initiative is indeterminate in scope. If the initiative is indeterminate in scope, the management component assigns the initiative to a program management team instead of a smaller project development team. The program management team develops the initiative sufficiently to determine whether the initiative is to be developed as multiple projects or as a single project, and enters this determination via a user interface. The management component assigns the initiative to a project management team if the initiative is to be developed as a single project, thereby reducing the resource requirements from the larger program management team to the smaller project management team to develop a single project. However, if the initiative is to be developed as multiple projects, the management component enables the program management team to more easily divide the initiative into multiple projects, and assign each of the projects to project management teams supervised by the program management team.

The program management team provides centralized financial management while supervising project management teams that are freed to focus on the delivery of project requirements. The program management team may easily reallocate resources between the projects if one of the projects exceeds its budgeted resources and one of the other projects does not need all of its allocated resources.

A project management team may hesitate to identify project requirements that would require dividing a project into related projects, such that some of the projects may be subsequently managed by other project management teams. Coordinating the deadlines for these related projects may be a challenge as each independent project team adjusts the deadlines for its own project based on its own needs. However, if a program management team identifies requirements that require a project to be divided into multiple projects, the program management team delegates the projects to project management teams supervised by the program management team, and coordinates the deadlines for each project. By packaging project requirements into coordinated projects, the program management team may also reduce the possibility that independent project teams eventually work on the same requirements for separately developed projects. Furthermore, the program management team may allocate resources to coordinated projects more efficiently than separate project management teams may allocate resources to separate projects.

Assigning an indeterminate scope initiative to a program management team may temporarily require more resources for an initiative that is subsequently developed as a single project. However, it is believed to be an insight of this disclosure that the above advantages gained from assigning indeterminate scope initiatives to a program management team may more than offset the temporary allocation of more resources on a few occasions, thereby providing a better overall business value.

FIG. 1 illustrates a system 100 for program management for indeterminate scope initiatives according to some embodiments of the present disclosure. The system 100 includes a program management team 102, a project management team 104, projects 106-110, a server 112, a program user interface 114, a project user interface 116, and initiative data 118. The program management team 102 manages a first project 106 and a second project 108. The program management team 102 may delegate some of the management of the first project 106 and the second project 108 to project management teams, which are not depicted in FIG. 1, that are supervised by the program management team 102. The project management team 104 manages a third project 110. Via the program user interface 114 and via the project user interface 116, the server 112 assigns initiatives to the program management team 102 and the project management team 104, enables the program management team 102 to manage the first project 106 and the second project 108, and enables the project management team 104 to manage the third project 110. The program management team 102 may include a business manager, a requirements manager, a work package manager, a solutions architect, a configuration manager, a risk manager, a release manager, and a program manager. The program user interface 114 and the project manager interface 116 may access information about the projects 106-110 and the initiative data 118 via the server 112. The initiative data 118 may be input to the server 112 via the program user interface 114 and/or the project user interface 116, and include information about initiatives, including the initiatives that are developed as the projects 106-110.

The server 112 includes a management component 120 that receives the initiative data 118 defined during the initial development for an initiative, either via the program user interface 114, the project user interface 116, or via another software component that manages data for initiatives. The server 112 may enable the initial data 118 to be defined during the initial development for the initiative by communicating data for ideas, concepts, and initiatives via user interfaces, such as the user interfaces 114-116. Based on the initiative data 118 defined during the initial development for an initiative, the management component 120 assigns the initiative to the project management team 104 via the project user interface 116 or to the program management team 102 via the program user interface 114.

For example, if analysis of the initiative data 118 indicates that the initiative requires 6 months and 6 employees to upgrade a customer care application, the initiative has a small scope that the project management team 104 can effectively manage. Therefore, the management component 120 assigns the application upgrade initiative to the project management team 104 via the project user interface 116.

In another example, if analysis of the initiative data 118 indicates that the initiative requires 18 months and 18 employees to improve the customer care system, the initiative has a scope that is beyond the scope of what the project management team 104 can effectively manage. Therefore, the management component 120 assigns the system improvement initiative to the program management team 102 via the program user interface 114.

In yet another example, if analysis of the initiative data 118 indicates that after the initial development of the initiative, the initiative requires an unknown amount of months and an unknown number of employees to modify an aspect of the customer care system, the initiative is indeterminate in scope. Although indeterminate scope initiatives are customarily assigned to project management teams to avoid incurring a program management team's greater allocation of resources for what may be a small scope initiative, the management component 120 assigns the system modification initiative to the program management team 102 via the program user interface 114.

Assignment of an indeterminate scope initiative to the larger program management team 102 rather than to the smaller project management team 104 may result in greater expenses for an initiative that is eventually developed as a project. However, these potentially greater expenses may be more than offset by the savings that result from assigning an indeterminate scope initiative to the program management team 102 rather than to the project management team 104 for an initiative that is eventually developed as multiple projects. The program management team 102 may be more efficient than the project management team 104 at splitting an initiative into multiple projects, thereby saving time, effort, and expenses.

The management component 120 enables the program management team 102 to develop an indeterminate scope initiative sufficiently to determine whether or not the indeterminate scope initiative is to be developed as multiple projects. For example, the management component 120 allocates resources via the program user interface 114 that enable the program management team 102 to manage a small project that determines the scope of the system modification initiative, which may be accomplished by delegating the small project to a supervised project management team. If the initial development of the initiative may not have been capable of determining the scope of the initiative, the allocation of additional resources may enable the supervised project management team to develop a small project to determine the scope of the initiative.

The management component 120 receives the determination from the program management team 102 via the program user interface 114 whether the initiative is to be developed as only one project or as multiple projects. If the program management team 102 determines that the initiative is to be developed as only one project, the management component 120 assigns the initiative as a small scope initiative to the project management team 104 via the project user interface 116. This small scope assignment reduces the allocation of resources for the initiative from a program management team's significant allocation of resources to a project management team's limited allocation of resources.

If the program management team 102 determines that the initiative is to be developed as multiple projects, the management component 120 enables the program management team 102 via the program user interface 114 to develop the initiative as multiple projects for a large scope initiative. For example, the management component 120 outputs the initiative data 118, project requirements, packages of work, delivery schedules, and budgets to the program management team 102 via the program user interface 114 to enable development of the initiative as multiple projects. Because the indeterminate scope initiative was already assigned to the program management team 102, the time, effort, and expenses that would have been expended by the project management team splitting the initiative into multiple projects may be saved.

Upon receipt of the initiative data 118, the program management team 102 identifies and compiles project requirements for multiple projects, such as a set of project requirements for a customer care system improvement. The project requirements may support the identification of a budget, such as a budget of $10 million for the customer care system modification initiative.

While identifying project requirements, the management component 120 may identify an interdependency between projects assigned to different program management teams based on similar project requirements. If the management component 120 identifies interdependent projects, the management component 120 may reassign one of the projects to a different program management team. For example, the management component 120 identifies an interdependency between the information technology project requirements managed by the program management team 102 and an application upgrade project's requirements managed by another program management team due to both projects impacting the same application. Continuing this example, the management component 120 reassigns the application upgrade project from the other program management team to the program management team 102 via the program user interface 114, so that the interdependent project requirements may be managed in a coordinated manner.

The management component 120 may record the project requirements identified and compiled by the program management team 102 via the program user interface 114 and output the project requirements via the program user interface 114 to enable the program management team 102 to identify and compile packages of work to be developed as multiple projects. For example, the program management team 102 identifies packages of work for the information technology domain, the networks domain, and the products domain to be developed as projects for the customer care system modification initiative.

The management component 120 may record the packages of work identified by the program management team 102 via the program user interface 114. The management component 120 may also output the packages of work via the program user interface 114 to enable the program management team 102 to identify a delivery schedule and a budget for the packages of work, to identify risks for the packages of work, and to determine a strategy of mitigation and/or response for the identified risks. For example, the program management team 102 estimates a budget of $5 million for the information technology package of work, $2 million for the network package of work, and $3 for the product package of work, with each estimate based on a quantitative assessment of expected costs within a predefined accuracy threshold, such as plus or minus 10 percent. Continuing this example, the program management team 102 establishes a delivery schedule that requires the information technology package of work to be completed in 12 months, the network package of work to begin in 12 months and be completed in 18 months, and the product package of work to begin in 18 months and be completed in 24 months. If the project management team 104 had been assigned an indeterminate scope initiative, the project management team 104 may have experienced delays and difficulties in establishing different delivery schedules for different packages if any of the different delivery schedules exceeded the end of the delivery schedule initially established for the indeterminate scope initiative. Further to this example, the program management team 102 identifies the probability of risks for each package of work, identifies the impact of each identified risk, and develops a mitigation/response plan for each identified risk. The program management team 102 may monitor the identified risks and the impact of each risk via the program user interface 114 as each package of work is developed as a project.

The management component 120 may record the delivery schedule and the budget identified by the program management team 102 via the program user interface 114 and output the delivery schedule and the budget via the program user interface 114. The delivery schedule and the budget enable the program management team 102 to create release packages for the packages of work to be developed as multiple projects, to allocate resources for the packages of work, and to initiate development of the packages of work as projects. For example, the program management team 102 assigns a team of information technology employees to begin developing the information technology work package as an information technology project during the next 12 months, after which the information technology project will be released for testing by the team of network employees who will be developing the network work package as 2 concurrent network projects.

The management component 120 may record, measure, and output current initiative expenditures via the program user interface 114 when the development of the initiative reaches a funding milestone. For example, the management component 120 outputs the current expenditures for the customer care system modification initiative via the program user interface 114 when the information technology team has been developing the information technology project for 3 months. The program management team 102 may assess the development of the customer care system modification initiative during the first 3 months and request funding from a portfolio management team for the next 3 months based on the assessment. The portfolio management team may review the initiative based on the progress made for the initiative, the finances spent to date on the initiative, the forecast for the initiative's next cycle of growth, and the initiative's continued alignment with the strategies identified by the portfolio management team. In contrast to a project management team's budget, which may be fully funded for the expected duration of the project management team's project, budgets for projects managed by the program management team are reviewed periodically, thereby reducing the risk of developments exceeding the projects' budgets.

The management component 120 may determine whether a project has exceeded its budget. For example, one of the network projects exceeds its pro-rated budget of $0.5 million at the mid-point of the projects' schedule, at the end of 15 months. In response, the management component 120 allocates some of the other network project's budget to the network project's budget because the network project has completed some work requirements that were originally assigned to the other network project.

The management component 120 may verify progress of the projects through a development cycle by measuring performance of the projects against key performance criteria. For example, the management component 120 outputs key performance criteria to the program user interface 114 that indicate that after 9 months of development the information technology project has completed 110% of its scheduled work requirements and has spent 105% of its pro-rated budget.

The management component 120 may modify at least one of a scope, a budget, and a schedule for the multiple projects to ensure that appropriate reviews and approvals are completed. For example, the management component 120 reduces one of network projects' budget to reflect the reduced work requirements for that network project and the reallocation of some of that network project's budget to the other network project's budget.

The management component 120 may determine whether development of a project has reached a development milestone. For example, the management component 120 determines that the product project has reached its mid-point. If the project has reached a development milestone, the management component 120 may determine whether to continue development of the project or the initiative. For example, the management component 120 determines whether the product project has ceased to meet its requirements or whether the product project has delivered on all of its requirements. If the management component 120 determines to continue development of the project or the initiative, the management component 120 continues development of the project or the initiative by continuing to output the initiative data 118, project requirements, packages of work, delivery schedules, and budgets to the program management team 102 via the program user interface 114. If the management component 120 determines not to continue development of the project or the initiative, the management component 120 may detail an orderly process of ending the project or the initiative via the program user interface 114. For example, the management component 120 collects formal customer acceptance of the project's deliverables, and documents the completion of the project via the program user interface 114. In contrast to a project, which begins development with a specified deadline and specified requirements to be delivered, the program management team 102 may continue to function indefinitely provided that the initiative and its projects continue to generate business requirements that are justifiable.

Figure 2:
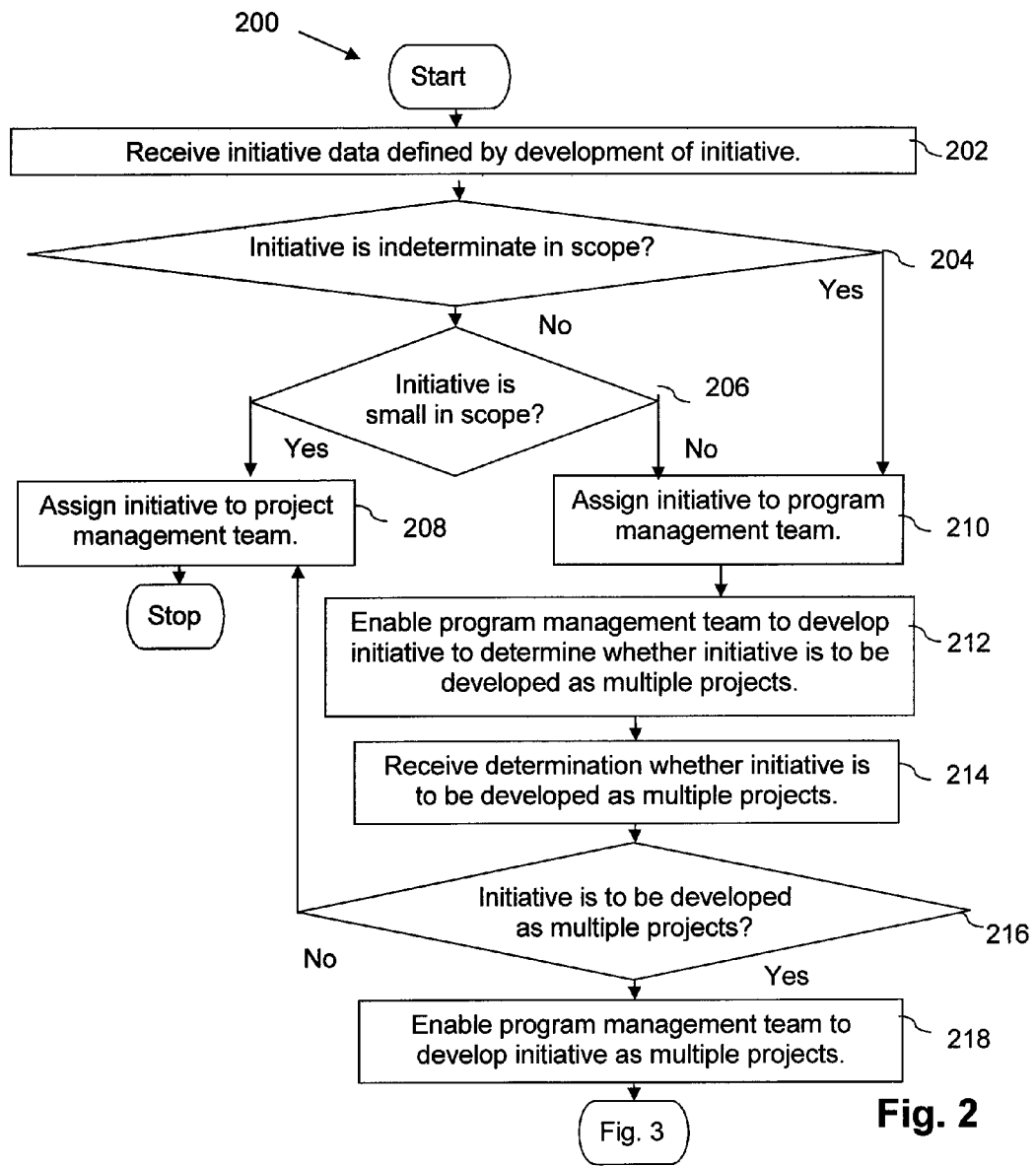
FIG. 2 is a flowchart for a method for program management for indeterminate scope initiatives according to some embodiments of the present disclosure.

FIG. 2 shows a flowchart of a method 200 for program management for indeterminate scope initiatives according to some embodiments of the present disclosure. The system 100 can execute the method 200 to determine assignment of an initiative based on the initiative's scope.

In box 202, initiative data defined by initial development of an initiative is received. For example, the management component 120 receives the initiative data 118 defined by initial development of the customer care system modification initiative via the program user interface 114.

In box 204, whether the initiative is indeterminate in scope is determined. For example, the management component 120 determines whether or not the initiative is indeterminate in scope. If the initiative is not indeterminate in scope, the method continues to box 206. If the initiative is indeterminate in scope, the method proceeds to box 210.

In box 206, whether the initiative is small in scope is determined. For example, the management component 120 determines whether or not the initiative is small in scope. If the initiative is not small in scope, the method continues to box 208. If the initiative is small in scope, the method proceeds to box 210.

In box 208, the initiative is assigned to a project management team. For example, the management component 120 assigns the application upgrade initiative to the project management team 104 via the project user interface 116, and the method terminates.

In box 210, the initiative is assigned to a program management team. For example, the management component 120 assigns the customer care system modification initiative to the program management team 102 via the program user interface 114.

In box 212, the program management team is enabled to develop the initiative to determine whether the initiative is to be developed as multiple projects. For example, the management component 120 enables the program management team 102 via the program user interface 114 to develop the customer care system modification initiative to determine whether or not this initiative is to be developed as multiple projects.

In box 214, a determination whether the initiative is to be developed as multiple projects is received. For example, the management component 120 receives a determination via the program user interface 114 whether the customer care system modification initiative is to be developed as multiple projects.

In box 216, whether the initiative is to be developed as multiple projects is determined. For example, the management component 120 determines whether the customer care system modification initiative is to be developed as multiple projects.

In box 218, the program management team is enabled to develop the initiative as multiple projects. For example, the management component 120 enables the program management team 102 via the program user interface 114 to develop the customer care system modification initiative as multiple projects.

Figure 3:
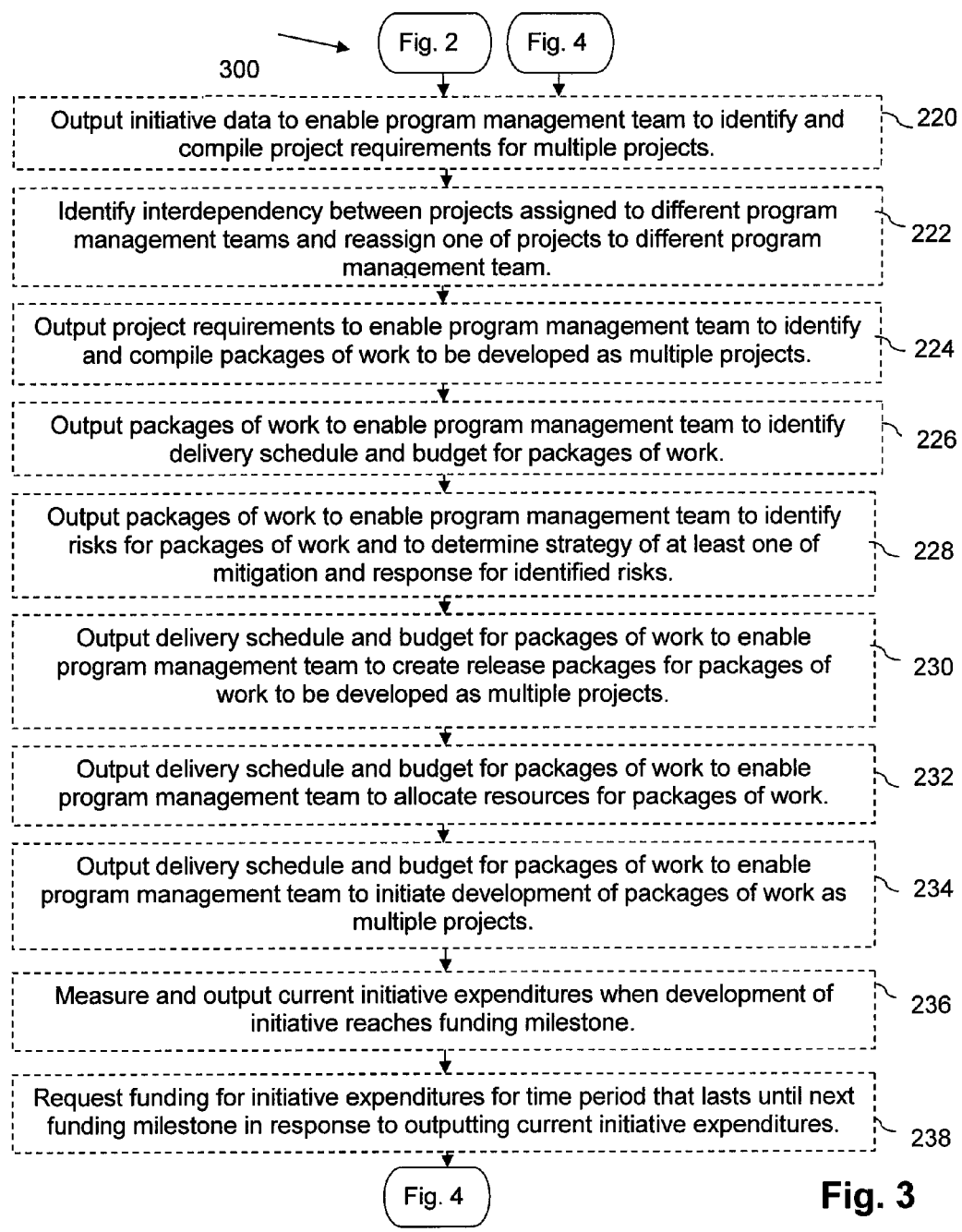
FIG. 3 is a flowchart for another method for program management for indeterminate scope initiatives according to some embodiments of the present disclosure.

FIG. 3 shows a flowchart of a method 300 for program management for indeterminate scope initiatives according to some embodiments of the present disclosure. The system 100 can execute the method 300 to identify a delivery schedule and budget and to output the delivery schedule and budget to enable the creation of release packages, the allocation of resources, and the initiation of development.

In box 220, initiative data is optionally output to enable the program management team to identify and compile project requirements for multiple projects. For example, the management component 120 outputs the initiative data 118 via the program user interface 114 to enable a requirements manager on the program management team 102 to identify and compile information technology, network, and product requirements.

In box 222, an interdependency between projects assigned to different program management teams is optionally identified and one of the projects is reassigned to a different program management team. For example, the management component 120 identifies an interdependency between projects assigned to different program management teams and reassigns the application upgrade project to the program management team 102 via the program user interface 114.

In box 224, project requirements are optionally output to enable the program management team to identify and compile packages of work to be developed as multiple projects. For example, the management component 120 outputs project requirements via the program user interface 114 to enable a work package manager on the program management team 102 to identify and compile packages of work to be developed as information technology, network, and product projects.

In box 226, the packages of work are optionally output to enable the program management team to identify a delivery schedule and a budget for the packages of work. For example, the management component 120 outputs the packages of work via the program user interface 114 to enable a configuration manager on the program management team 102 to identify a delivery schedule and a budget for the information technology, network, and product packages of work.

In box 228, the packages of work are optionally output to enable the program management team to identify risks for the packages of work and to determine a strategy of mitigation and/or response for identified risks. For example, the management component 120 outputs packages of work via the program user interface 114 to enable a risk manager on the program management team 102 to identify risks for the information technology, network, and product packages of work and to determine strategy of mitigation and/or response for identified risks.

In box 230, the delivery schedule and the budget for packages of work are optionally output to enable the program management team to create release packages for the packages of work to be developed as multiple projects. For example, the management component 120 outputs a delivery schedule and a budget for the packages of work via the program user interface 114 to enable a release manager on the program management team 102 to create release packages for the information technology, network, and product packages of work to be developed as information technology, network, and product projects.

In box 232, the delivery schedule and the budget for packages of work are optionally output to enable the program management team to allocate resources for the packages of work. For example, the management component 120 outputs the delivery schedule and the budget for the packages of work via the program user interface 114 to enable a program manager on the program management team 102 to allocate resources for the information technology, network, and product packages of work.

In box 234, the delivery schedule and the budget for packages of work are optionally output to enable the program management team to initiate development of packages of work as multiple projects. For example, the management component 120 outputs the delivery schedule and the budget for packages of work via the program user interface 114 to enable the program manager on the program management team 102 to initiate development of the information technology, network, and product packages of work as information technology, network, and product projects.

In box 236, current initiative expenditures are optionally measured and output when development of the initiative reaches a funding milestone. For example, the management component 120 measures and outputs current initiative expenditures via a user interface to the portfolio management team when development of the customer care system modification initiative reaches the 3 month funding milestone.

In box 238, funding for initiative expenditures for a time period that lasts until the next funding milestone is optionally requested in response to outputting current initiative expenditures. For example, the management component 120 requests funding from the portfolio management team via a user interface for the customer care system modification initiative until the 6 month funding milestone.

Figure 4:
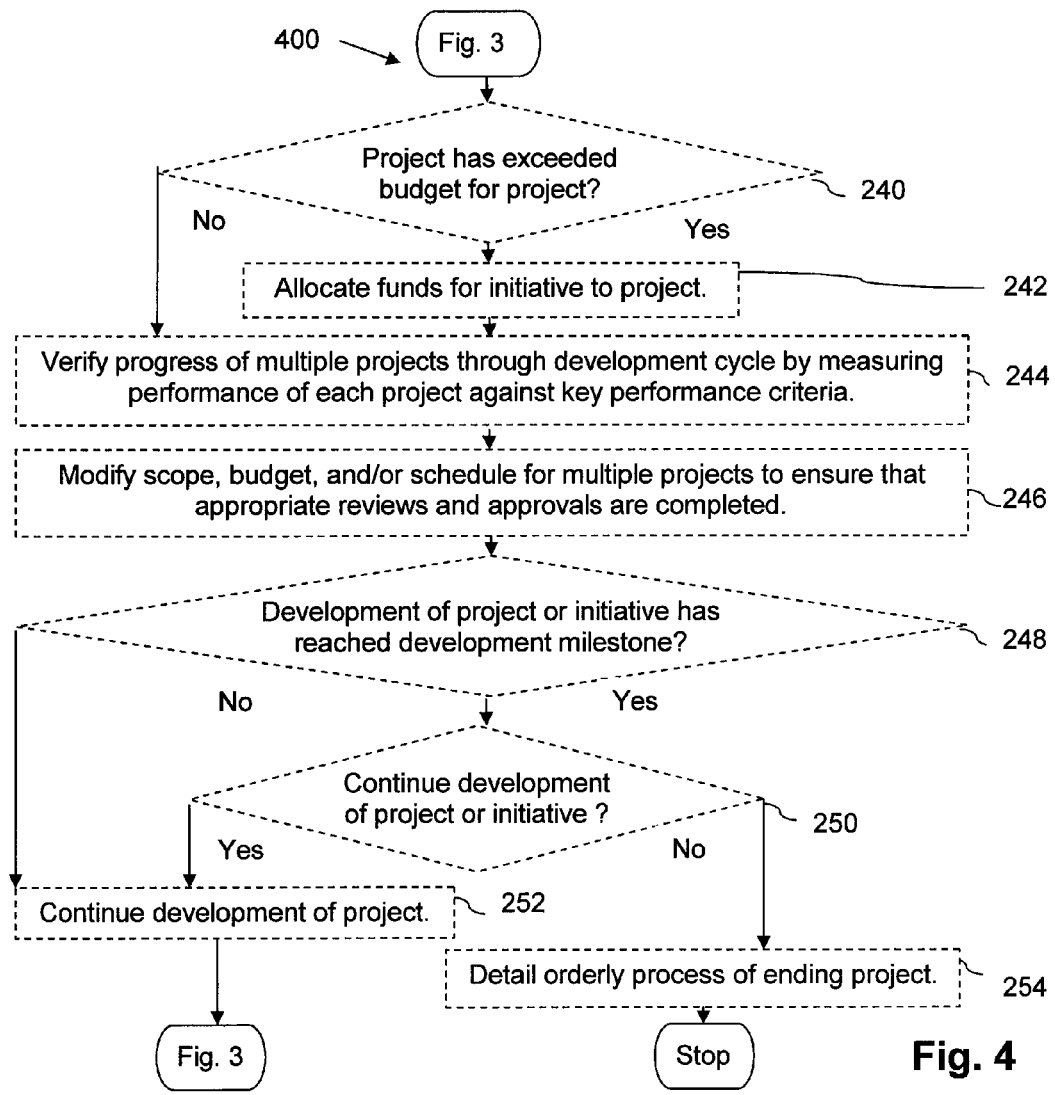
FIG. 4 is a flowchart for yet another method for program management for indeterminate scope initiatives according to some embodiments of the present disclosure.

FIG. 4 shows a flowchart of a method 400 for program management for indeterminate scope initiatives according to some embodiments of the present disclosure. The system 100 can execute the method 400 to allocate funds for projects exceeding their budgets and determine whether to continue development of the project or the initiative.

In box 240, whether a project has exceeded a budget for the project is optionally determined. For example, the management component 120 determines whether a project has exceeded the budget for the project. If the project has exceeded its budget, the method 400 continues to box 242. If the project has not exceeded its budget, the method 400 proceeds to box 244.

In box 242, funds for the initiative are optionally allocated to the project. For example, the management component 120 allocates funds for the customer care system modification initiative to the one of the network projects from the other network project.

In box 244, progress of multiple projects is optionally verified through a development cycle by measuring performance of each project against key performance criteria. For example, the management component 120 verifies progress of the information technology project via the program user interface 114 by measuring performance of the information technology project against key performance criteria for completion of scheduled work requirements and expenditures compared to a pro-rated budget.

In box 246, a scope, a budget, and/or a schedule for multiple projects is optionally modified to ensure that appropriate reviews and approvals are completed. For example, the management component 120 reduces one of network projects' budget to reflect the reduced work requirements for that network project and the reallocation of some of that network project's budget to the other network project's budget In box 248, whether development of a project or an initiative has reached a development milestone is optionally determined. For example, the management component 120 determines whether or not development of customer care system modification initiative has reached a development milestone. If development of the project or the initiative has reached the development milestone, the method 400 continues to box 250. If development of the project or the initiative has not reached the development milestone, the method 400 proceeds to box 252.

In box 250, whether development of the project or the initiative is to be continued is optionally determined. For example, the management component 120 determines whether or not to continue development of the customer care system modification initiative. If development of the project or the initiative is to be continued, the method 400 continues to box 252. If development of the project or the initiative is not to be continued, the method 400 proceeds to box 254.

In box 252, development of the project or the initiative is optionally continued. For example, the method 400 returns to box 220 to continue development of the customer care system modification initiative.

In box 254, an orderly process of ending the project or the initiative is optionally detailed. For example, the management component 120 collects formal customer acceptance of the customer care system modification initiative's deliverables, and documents the completion of the customer care system modification initiative via the program user interface 114.

Figure 5:
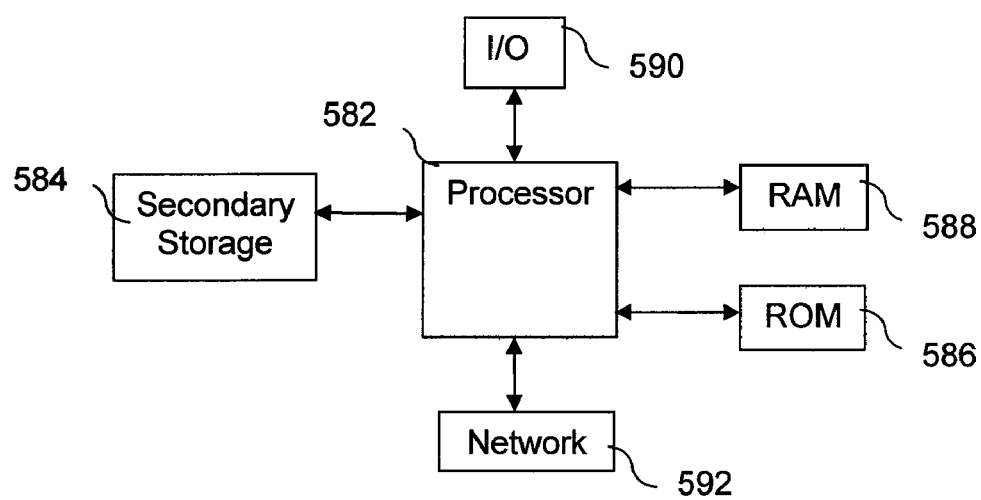
FIG. 5 illustrates an exemplary computer system suitable for implementing embodiments of the disclosure.

Some aspects of the system described above may be implemented on a computer with sufficient processing power, memory resources, and network throughput capability to handle the necessary workload placed upon it. FIG. 5 illustrates a typical computer system suitable for implementing one or more embodiments disclosed herein. The computer system 580 includes a processor 582 (which may be referred to as a central processor unit or CPU) that is in communication with memory devices including secondary storage 584, read only memory (ROM) 586, random access memory (RAM) 588, input/output (I/O) devices 590, and network connectivity devices 592. The processor 582 may be implemented as one or more CPU chips.

It is understood that by programming and/or loading executable instructions onto the computer system 580, at least one of the CPU 582, the RAM 588, and the ROM 586 are changed, transforming the computer system 580 in part into a particular machine or apparatus having the novel functionality taught by the present disclosure. It is fundamental to the electrical engineering and software engineering arts that functionality that can be implemented by loading executable software into a computer can be converted to a hardware implementation by well known design rules. Decisions between implementing a concept in software versus hardware typically hinge on considerations of stability of the design and numbers of units to be produced rather than any issues involved in translating from the software domain to the hardware domain. Generally, a design that is still subject to frequent change may be preferred to be implemented in software, because re-spinning a hardware implementation is more expensive than re-spinning a software design. Generally, a design that is stable that will be produced in large volume may be preferred to be implemented in hardware, for example in an application specific integrated circuit (ASIC), because for large production runs the hardware implementation may be less expensive than the software implementation. Often a design may be developed and tested in a software form and later transformed, by well known design rules, to an equivalent hardware implementation in an application specific integrated circuit that hardwires the instructions of the software. In the same manner as a machine controlled by a new ASIC is a particular machine or apparatus, likewise a computer that has been programmed and/or loaded with executable instructions may be viewed as a particular machine or apparatus.

The secondary storage 584 is typically comprised of one or more disk drives or tape drives and is used for non-volatile storage of data and as an over-flow data storage device if RAM 588 is not large enough to hold all working data. Secondary storage 584 may be used to store programs which are loaded into RAM 588 when such programs are selected for execution. The ROM 586 is used to store instructions and perhaps data which are read during program execution. ROM 586 is a non-volatile memory device which typically has a small memory capacity relative to the larger memory capacity of secondary storage 584. The RAM 588 is used to store volatile data and perhaps to store instructions. Access to both ROM 586 and RAM 588 is typically faster than to secondary storage 584.

I/O devices 590 may include printers, video monitors, liquid crystal displays (LCDs), touch screen displays, keyboards, keypads, switches, dials, mice, track balls, voice recognizers, card readers, paper tape readers, or other well-known input devices.

The network connectivity devices 592 may take the form of modems, modem banks, Ethernet cards, universal serial bus (USB) interface cards, serial interfaces, token ring cards, fiber distributed data interface (FDDI) cards, wireless local area network (MAN) cards, radio transceiver cards such as code division multiple access (CDMA), global system for mobile communications (GSM), and/or worldwide interoperability for microwave access (WiMAX) radio transceiver cards, and other well-known network devices. These network connectivity devices 592 may enable the processor 582 to communicate with an Internet or one or more intranets. With such a network connection, it is contemplated that the processor 582 might receive information from the network, or might output information to the network in the course of performing the above-described method steps. Such information, which is often represented as a sequence of instructions to be executed using processor 582, may be received from and outputted to the network, for example, in the form of a computer data signal embodied in a carrier wave.

Such information, which may include data or instructions to be executed using processor 582 for example, may be received from and outputted to the network, for example, in the form of a computer data baseband signal or signal embodied in a carrier wave. The baseband signal or signal embodied in the carrier wave generated by the network connectivity devices 592 may propagate in or on the surface of electrical conductors, in coaxial cables, in waveguides, in optical media, for example optical fiber, or in the air or free space. The information contained in the baseband signal or signal embedded in the carrier wave may be ordered according to different sequences, as may be desirable for either processing or generating the information or transmitting or receiving the information. The baseband signal or signal embedded in the carrier wave, or other types of signals currently used or hereafter developed, referred to herein as the transmission medium, may be generated according to several methods well known to one skilled in the art.

The processor 582 executes instructions, codes, computer programs, scripts which it accesses from hard disk, floppy disk, optical disk (these various disk based systems may all be considered secondary storage 584), ROM 586, RAM 588, or the network connectivity devices 592. While only one processor 582 is shown, multiple processors may be present. Thus, while instructions may be discussed as executed by a processor, the instructions may be executed simultaneously, serially, or otherwise executed by one or multiple processors.

While several embodiments have been provided in the present disclosure, it should be understood that the disclosed systems and methods may be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted or not implemented.

Also, techniques, systems, subsystems, and methods described and illustrated in the various embodiments as discrete or separate may be combined or integrated with other systems, modules, techniques, or methods without departing from the scope of the present disclosure. Other items shown or discussed as directly coupled or communicating with each other may be indirectly coupled or communicating through some interface, device, or intermediate component, whether electrically, mechanically, or otherwise. Other examples of changes, substitutions, and alterations are ascertainable by one skilled in the art and could be made without departing from the spirit and scope disclosed herein.

What is claimed is:

1. A computer implemented method for program management for indeterminate scope initiatives, comprising:
   receiving, by a computer, initiative data defined by initial development of an initiative;
   determining, by the computer, determine whether the initiative is indeterminate in scope based on the initiative data, wherein the initiative is indeterminate in scope when the initiative data does not comprise at least one of an estimate of a duration for the initiative or an estimate of a level of effort for the initiative, wherein the initiative is assigned to a project management team when the initiative is determined to be not indeterminate, and wherein the initiative is assigned to a program management team when the initiative is determined to be indeterminate;
   assigning, by the computer, the initiative to a program management team in response to a determination that the initiative is indeterminate in scope, wherein the program management team has a capacity to manage a group of related projects in a coordinated manner to obtain benefits and control unavailable from managing the group of related projects individually, and wherein the project management team manages projects individually;
   enabling, by the computer, the program management team to develop the initiative to determine whether the initiative is to be developed as a single project or multiple projects;

receiving, via a user interface stored on a non-transitory, computer readable media and executed by a processor, a determination whether the initiative is to be developed as the single project or the multiple projects;

assigning, by the user interface, the initiative to the project management team in response to receiving a determination that the initiative is to be developed as the single project multiple projects; and enabling, by the computer, the program management team to develop the initiative as the multiple projects in response to receiving a determination that the initiative is to be developed as the multiple projects.

2. The computer implemented method of claim 1, further comprising:

determining whether the initiative is small in scope based on the initiative data in response to a determination that the initiative is not indeterminate in scope;

assigning the initiative to the project management team in response to the determination that the initiative is small in scope.

3. The computer implemented method of claim 1, further comprising:

determining whether the initiative is large in scope based on the initiative data in response to a determination that the initiative is not indeterminate in scope;

assigning the initiative to the program management team in response to the determination that the initiative is large in scope.

4. The computer implemented method of claim 1, further comprising:

measuring and outputting current initiative expenditures when the development of the initiative reaches a funding milestone; and requesting funding for initiative expenditures for a time period that lasts until a next funding milestone in response to measuring and outputting current initiative expenditures.

5. The computer implemented method of claim 1, further comprising:

determining whether a project of the multiple projects has exceeded a budget for the project; and allocating funds for the initiative to the project in response to a determination that the project has exceeded the budget for the project.

6. The computer implemented method of claim 1, further comprising verifying progress of the multiple projects through a development cycle by measuring performance of each of the multiple projects against key performance criteria.

7. The computer implemented method of claim 1, further comprising identifying an interdependency between projects assigned to different program management teams and reassigning one of the projects to a different one of the different program management teams.

8. The computer implemented method of claim 1, further comprising modifying at least one of a scope, a budget, and a schedule for the multiple projects to ensure that appropriate reviews and approvals are completed.

* * * * *